Patented June 2, 1942

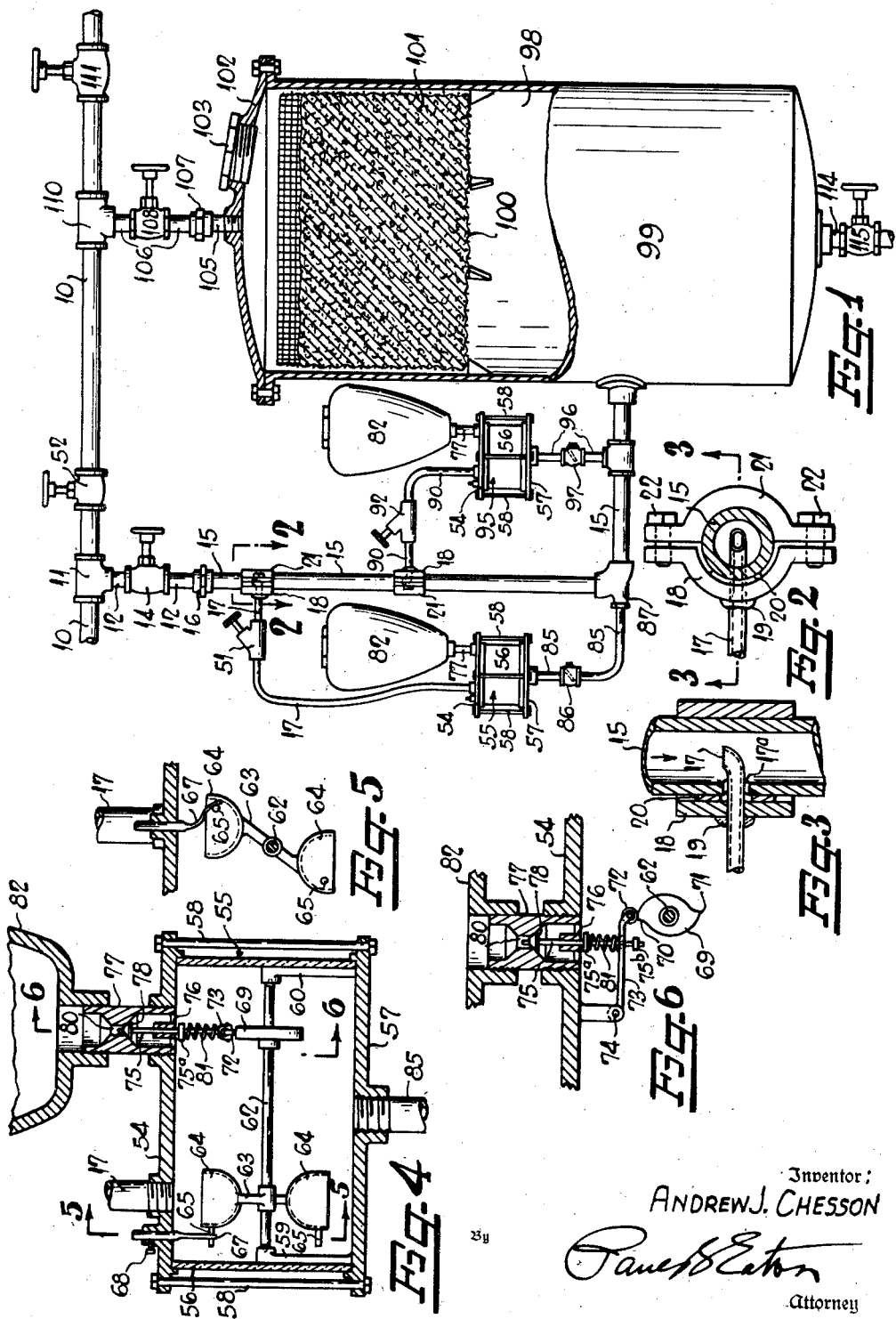

2,284,618

UNITED STATES PATENT OFFICE 2,284,618

WATER TREATING APPARATUS

Andrew J. Chesson, Miami, Fla.

Application April 6, 1939, Serial No. 266,284

1 Claim. (Cl. 210—19)

This invention relates to a water softening apparatus and forms a continuation in part of my copending patent application, Serial Number 202,921, filed April 19, 1938, which has matured into Patent Number 2,195,616. In this copending application, a fractional portion of a supply of water is by-passed from the main line over a cake of water softening material from whence it is returned to the main line of flow. The water, which is by-passed over this material, absorbs a certain portion of this softening material. When the treated by-passed water returns to the main line it mixes with the water which was not by-passed so that all of the water is properly treated with this softening material. After the water has been softened it is necessary to add coagulating and purification agents to make it safe and desirable for use.

It is an object of this invention to provide an apparatus having means for periodically adding predetermined quantities of chloride solution to softened water and a further means for adding predetermined quantities of a coagulating agent, such as alum, to this solution.

It is a further object of the invention to provide a tank having a filter in the upper portion thereof, and a water compartment disposed in the lower portion into which the treated water is adapted to flow. The water coming from the softening device will be discharged into the space below the filter where its force will be dissipated. This will allow the proper coagulation to take place, after which the treated water will seep upwardly through the filter and to the dispensing points.

Some of the objects of the invention having been stated, other objects will appear as the description proceeds, when taken in connection with the accompanying drawing, in which—

Figure 1 is an elevation of my invention showing certain portions thereof in section;

Figure 2 is a sectional view through the water treating mechanism and taken along the line 2—2 in Figure 1;

Figure 3 is an enlarged sectional view taken along the line 3—3 in Figure 2;

Figure 4 is a vertical sectional view through the apparatus for admitting predetermined quantities of chlorine, chloride of lime, or other treating solutions to the softened water;

Figure 5 is a sectional view taken along the line 5—5 in Figure 4;

Figure 6 is a vertical sectional view taken along the line 6—6 in Figure 4.

Referring more specifically to the drawing, the numeral 10 denotes a water supply main through which water is adapted to flow from any suitable source such as a reservoir to a dispensing point such as a spigot. The main 10 has a T 11 installed therein from which leads a pipe 12, which pipe has a hand-valve 14 therein. The pipe 12 is connected to another pipe 15 by any suitable means such as union 16. Disposed in this pipe 15 is one end of a pitot tube 17 (see Figures 2 and 3), the open end of which is directed against the flow of water within the pipe. This tube penetrates a suitable hole 17a in the pipe and adjacent this point of penetration, the tube 17 is secured to a semi-circular clamp member 18 by any suitable means such as welding 19. Disposed between this member 18 and the pipe is a suitable gasket 20 to prevent any leakage of water from the pipe at this point. The member 18 is held against the side of pipe 15 by means of another semi-circular clamp member 21 and stud bolts 22. As the water flows downwardly through the pipe 15, it is seen that the pitot tube will divert a fractional portion thereof to the left in Figures 1 and 3. Disposed in the tube 17 is a needle valve 51 which is operated to control the flow of liquid. It should be noted that the main 10 also has a hand valve 52 installed therein which is normally closed; therefore, the entire supply of water in the main 10 will be directed downward through the pipes 12 and 15. The lower end of the tube 17 is threadably secured into cap member 54 of mixing chamber 55. This cap has a transparent casing 56 disposed on the lower side thereof and on the lower side of this casing 56 is a bottom 57. The members 54, 56 and 57 are held together by any suitable means such as vertically disposed bolts 58.

The bottom 57 has bearings 59 and 60 extending upwardly therefrom, between which shaft 62 is mounted (Figure 4). This shaft has fixedly secured thereon, an arm 63, each end of which supports a cup 64. Each of these cups has a pin 65 extending laterally therefrom which is adapted to engage the lower end of flexible spring member 67, said spring member 67 being adjustably secured in the cover member 54 by any suitable means such as a set screw 68.

The water which is directed downwardly into the mixing chamber 55 by tube 17, is adapted to flow into one of the cups 64 which is disposed beneath the outlet port of tube 50. The spring member 67 is adapted to be so adjusted relative to the pin 65 that when the cup 64 becomes filled to the desired extent, the lower end of the spring 67 will deflect sufficiently to allow the filled cup 64 to rotate the shaft 62 approximately 180 degrees to empty its contents into the mixing chamber 55. When this is done, the lowermost cup 64 will occupy the position that the uppermost cup previously occupied relative to the spring 67, after which the water will flow into this cup.

The shaft 62 has a cam 69 fixedly secured thereon (see Figures 4 and 6) said cam having high points 70 and 71 thereon. The periphery of this cam is adapted to be contacted by roller 72 in the free end of a lever 73. This lever is pivotally secured as at 74 to the lower side of cap member 54. The intermediate portion of lever 73 is loosely penetrated by a vertically disposed pin 75 which pin extends upwardly and is slidably mounted in spider member 76, said spider member being secured in the lower portion of pipe 77. The upper portion of the pin 75 has a valve cap 78 thereon which closes port 80 when the roller 72 is disposed on a high side of the cam 69. Also disposed around pin 75 are collars 75a and 75b, the collar 75a being so positioned as to confine a coiled compression spring 81 around rod 75 and between this collar and lever 73. It is seen that this spring will allow a certain amount of flexibility to be added to the upward movement of the pin 75 and the valve cap 78. Threadably secured on the upper side of pipe 77 is a reservoir 82 in which a suitable purification agent is adapted to be placed, such as a chloride solution for purifying the water.

When one of the cups 64 becomes filled with water, the shaft 62 is allowed to rotate approximately 180 degrees, at which time the roller 72 will move past one of the points 70 or 71 to release the valve cap 78 and allow a predetermined quantity of chloride solution to flow downwardly into the mixing chamber 55. When the 180 degree rotation has taken place, the roller 72 again rides upon a high side of the cam 69 to cause the port 80 to be closed. Simultaneously with the closing of port 80 a pin 65 contacts spring 67 to hold the cup 64 in proper position until it is filled.

The lower side of the mixing chamber 55 has a tube 85 leading therefrom, said tube having a check valve 86 therein, for preventing reverse flow of the fluid. This tube leads again into pipe 15 as at 87.

It is sometimes desirable to add a suitable coagulating agent such as alum to the water in order that the free particles in the water will coagulate and settle. For this purpose a similar device is used, to that which has just been described for adding a chloride solution. A pitot tube 90 leads from the pipe 15, said tube having a needle valve 92 therein for controlling the flow. The lower end of the tube 90 leads to a mixing chamber 95, which is identical in all respects to a mixing chamber 55 just described. Since all parts are identical, a new description will not be made, but like reference characters will be given to like parts. Leading from the lower side of mixing chamber 95 is another tube 96, having a check valve 97 therein for preventing the reverse flow of the fluid through the pipe 96 and upwardly through the mixing chamber.

After the sterilization and coagulating elements have been added to the softened water, the entire supply is emptied into compartment 98 of tank 99. By providing this compartment, into which the water is discharged, the flow will be dissipated and the free particles in the water will settle to the bottom of the tank. The upper portion of this tank 99 has a suitable screen basket 100 installed therein which is adapted to contain a suitable filtering material such as sassafras root or charcoal 101. The upper portion of tank 99 has a cover 102 secured thereto, and this cover has a plug 103 threadably secured therein through which new filtering materials 101 are supplied to the tank. The cap 102 also has a pipe 105 threadably secured therein. This pipe is joined to another pipe 106 by means of a union 107, said pipe 106 having a hand valve 108 therein. The upper end of pipe 106 leads back into main 10 at the T member 110.

Therefore, it is seen that the sedimentation in the treated water is allowed to settle in the lower portion of compartment 98 after which the water is directed upwardly through the filter 101 and outwardly through pipes 105 and 106, and then back again into the main 10. The water then flows through hand valve 111 to any suitable point of dispensation.

The lower side of the tank 99 has a pipe 114 leading therefrom, in which a hand valve 115 is installed. When it is desired to wash the filter by reversing the flow in the tank 99, it is necessary to close the hand valves 111 and 14 and then open the hand valves 115 and 52. The water will then be allowed to flow through the main 10 downwardly through pipe 106, pipe 105, filter material 101, chamber 98 and out through pipe 114 and hand valve 115. This will not only clean the filter 101 but will also wash the sedimentation out of the bottom of tank 99.

In the drawing and specification, there has been set forth a preferred embodiment of the invention and although specific terms are employed, they are used in a generic and descriptive sense only and not for the purposes of limitation, the scope of the invention being set forth in the appended claim.

I claim:

Apparatus for feeding a treating liquid to water passing through a main, comprising a casing, a by-pass pipe leading from the main to the top of said casing, a pipe leading from the bottom of said casing back into the main, a horizontally disposed shaft in said casing, a plurality of spokes projecting from said shaft, a cup disposed on the end of each of the spokes, a resilient stop for arresting a cup directly below the end of the by-pass pipe so that water will fall by gravity thereinto, a source of treating liquid having a piped connection with the casing, a valve normally preventing flow of the treating liquid into the casing from said source, a cam on said shaft for opening said valve when a cup has been filled to a predetermined extent by water falling thereinto from said by-pass pipe to move the cup past the resilient stop to rotate said shaft a partial revolution until the next cup is arrested by said stop.

ANDREW J. CHESSON.